(12) United States Patent
Bekkedahl et al.

(10) Patent No.: US 7,258,945 B2
(45) Date of Patent: Aug. 21, 2007

(54) FUEL CELL HAVING A HYDROPHILIC SUBSTRATE LAYER

(75) Inventors: Timothy A. Bekkedahl, Loveland, CO (US); Lawrence J. Bregoli, Southwick, MA (US); Ned E. Cipollini, Enfield, CT (US); Timothy W. Patterson, East Hartford, CT (US); Marianne Pemberton, Manchester, CT (US); Jonathan Puhalski, Winsted, CT (US); Carl A. Reiser, Stonington, CT (US); Richard D. Sawyer, Groveton, NH (US); Margaret M. Steinbugler, East Windsor, CT (US); Jung S. Yi, Mansfield Center, CT (US)

(73) Assignee: UTC Power Corporation, South Windsor, CT (US)

( * ) Notice: Subject to any disclaimer, the term of this patent is extended or adjusted under 35 U.S.C. 154(b) by 349 days.

(21) Appl. No.: 10/722,946

(22) Filed: Nov. 26, 2003

(65) Prior Publication Data

US 2004/0106034 A1 Jun. 3, 2004

Related U.S. Application Data

(63) Continuation of application No. 10/012,157, filed on Nov. 28, 2001, now abandoned, which is a continuation-in-part of application No. 09/466,701, filed on Dec. 17, 1999, now abandoned.

(51) Int. Cl.
*H01M 8/04* (2006.01)
(52) U.S. Cl. .......................................... 429/39; 429/38
(58) Field of Classification Search ............. 429/26, 429/42, 44
See application file for complete search history.

(56) References Cited

U.S. PATENT DOCUMENTS 4,175,165 A 11/1979 Adlhart (Continued)

FOREIGN PATENT DOCUMENTS

WO WO94/11912 5/1994

OTHER PUBLICATIONS

R. F. Brady, Jr. *Fluoropolymers*, Chemistry in Britain, May 1990, pp. 427-430, V26, #5.
Paganin, V.A. et al, "Development and Electrochemical Studies of Gas Diffusion Electrodes for Polymer Electrolyte Fuel Cells" Journal of Applied Electrochemistry 26 (1996) 297-304.

*Primary Examiner*—Susy Tsang-Foster
*Assistant Examiner*—Shermanda L. Williams
(74) *Attorney, Agent, or Firm*—M. P. Williams

(57) ABSTRACT

A fuel cell power plant includes a fuel cell having a membrane electrode assembly (MEA), disposed between an anode support plate and a cathode support plate, the anode and/or cathode support plates include a hydrophilic substrate layer having a predetermined pore size. The pressure of the reactant gas streams is greater than the pressure of the coolant stream, such that a greater percentage of the pores within the hydrophilic substrate layer contain reactant gas rather than water. Any water that forms on the cathode side of the MEA will migrate through the cathode support plate and away from the MEA. Controlling the pressure also ensures that the coolant water will continually migrate from the coolant stream toward the anode side of the MEA, thereby preventing the membrane from becoming dry. Proper pore size and a pressure differential between coolant and reactants improves the electrical efficiency of the fuel cell.

3 Claims, 12 Drawing Sheets

U.S. PATENT DOCUMENTS

| | | |
|---|---|---|
| 4,233,181 A | 11/1980 | Goller et al. |
| 4,564,427 A | 1/1986 | Gruver et al. |
| 4,615,955 A | 10/1986 | Amakawa et al. |
| 4,636,274 A | 1/1987 | Gruver et al. |
| 4,769,297 A | 9/1988 | Reiser et al. |
| 5,211,984 A | 5/1993 | Wilson |
| 5,234,777 A | 8/1993 | Wilson |
| 5,252,410 A | 10/1993 | Wilkinson et al. |
| 5,300,370 A | 4/1994 | Washington et al. |
| 5,501,915 A | 3/1996 | Hards et al. |
| 5,503,944 A | 4/1996 | Meyer et al. |
| 5,641,586 A | 6/1997 | Wilson |
| 5,686,197 A | 11/1997 | Nishida et al. |
| 5,700,595 A | 12/1997 | Reiser |
| 5,840,414 A | 11/1998 | Bett et al. |
| 5,853,909 A * | 12/1998 | Reiser ......................... 429/13 |
| 5,998,058 A * | 12/1999 | Fredley ....................... 429/44 |
| 6,024,848 A * | 2/2000 | Dufner et al. .............. 204/252 |

* cited by examiner

FUEL CELL HAVING A HYDROPHILIC SUBSTRATE LAYER

CROSS REFERENCE TO RELATED APPLICATIONS

This is a continuation of U.S. patent application Ser. No. 10/012,157 filed Nov. 28, 2001 now abandoned, which is a continuation-in-part of U.S. patent application Ser. No. 09/466,701 filed on Dec. 17, 1999, now abandoned.

TECHNICAL FIELD

This invention relates to fuel cell power plants and more particularly, to fuel cell power plants utilizing a hydrophilic substrate layer within the anode and/or cathode of the fuel cell.

BACKGROUND ART

Fuel cell power plants are electrochemical alternative power sources for both stationary and mobile applications. The fuel cell, which is the heart of such power plant, consists of an anode, a cathode and an electrolyte that separates the two. Anode shall mean a positive electrode, and cathode shall mean a negative electrode. In the operation of a fuel cell, fuel reactant gas, which is typically a hydrogen rich stream, enters a support plate that is adjacent to the anode. Such a support plate is, therefore, referred to as an anode support plate. Oxidant reactant gas, which is commonly air, enters a support plate adjacent to the cathode. This support plate is, therefore, referred to as a cathode support plate. As the hydrogen rich stream passes through the anode support plate, a catalyst located between anode support plate and the electrolyte causes the hydrogen to oxidize, thereby resulting in the creation of hydrogen ions and electrons. While the hydrogen ions migrate through the electrolyte to the cathode, the electrons migrate through an external circuit to the cathode. Another catalyst on the cathode side of the electrolyte causes the oxygen to react with the hydrogen ions and electrons released at the anode, thereby forming water. The occurrence of these reactions near the catalysts and electrolyte creates an electric potential across the fuel cell. The flow of electrons through an external circuit that is connected to the fuel cell, therefore, produces useful work, such as powering an electric motor in a vehicle.

There are various types of fuel cells, which vary according to their electrolyte. The electrolyte is the ionic conducting substance between the anode and the cathode. One type of fuel cell includes a solid polymer electrolyte, otherwise referred to as a proton exchange membrane (PEM). Fuel cells incorporating a solid polymer membrane or proton exchange membrane will hereinafter be referred to as a PEM fuel cell. The catalyst layers within a PEM fuel cell are typically attached to both sides of the membrane, thereby forming a membrane electrode assembly (MEA). As noted above, while hydrogen ions pass through the MEA, the electrochemical reaction between the hydrogen ions, electrons, and oxidant reactant gas forms water within the cathode. This water is commonly referred to as "product water." In addition, water may also accumulate in the cathode, due to the drag of water molecules, which pass from the anode and through the MEA along with the hydrogen ions during the operation of the fuel cell. This water is commonly referred to as "proton drag water." The proton drag from the anode to the cathode results in a lower water content on the anode side of the PEM compared to the cathode side. This difference in water content between the anode and cathode sides results in an osmotic force, which fosters the flow of water from the cathode side of the PEM towards the anode side. However, if the PEM (i.e., electrolyte) doesn't remain highly saturated with water, the PEM resistance increases, and the useful power obtained from the fuel cell decreases. Additionally, if product water and drag water accumulate in the cathode, the accumulated water may impede and could prevent oxygen from reacting with the hydrogen ions and electrons. Accumulation of water in the cathode will thus reduce the electric potential created across the fuel cell, thereby limiting the fuel cell's performance. Furthermore, if the cathode water content fails to decrease, the cathode will flood, and the fuel cell will eventually cease to produce power and shut down.

In order to assist the oxidant reactant gas in reaching the catalyst on the MEA, the cathode support plate typically comprises a diffusion layer and a substrate layer. Both the diffusion layer and the substrate layer are typically constructed of porous carbon layers that are rendered hydrophobic. Hydrophobic means antagonistic to water and is therefore often referred to as wet-proofed. It is known, however, to utilize a hydrophilic substrate in lieu of a hydrophobic substrate. Hydrophilic means capable of absorbing water and therefore, is often referred to as wettable. U.S. Pat. No. 5,641,586, for example, describes a cathode support plate comprising a hydrophilic substrate layer and a hydrophobic diffusion layer. Objects of U.S. Pat. No. 5,641,586 included providing a porous support plate which reduced the pressure drop of the oxidant gas as it passed through such support plate, minimizing water accumulation within such support plate and maximizing access of the oxidant reactant gas to the catalyst. Although a hydrophilic substrate may reduce the pressure drop of the oxidant reactant gas through the cathode, the hydrophilic substrate, by its inherent nature, absorbs more water than a hydrophobic substrate. Therefore, unless the water is properly removed from the cathode support plate, the hydrophilic substrate will absorb the water, which, in turn, will eventually flood the cathode support plate. Flooding the cathode support plate would, therefore, negate one of the objects of U.S. Pat. No. 5,641,586: namely, the object relating to minimizing water accumulation.

Flooding the cathode support plate would also prevent the oxidant reactant gas from reaching the catalyst. U.S. Pat. No. 5,641,586 describes a cell operating at elevated pressure, and product water within such a cell typically exits the cell via the oxidant reactant gas exhaust stream as a combination of water vapor and entrained liquid water. Entrained liquid water moves along a reactant flow channel from the interior of the cell to the oxidant reactant gas exhaust stream. This concept is well accepted for cell configurations which utilize a hydrophobic substrate and a solid reactant support plate. U.S. Pat. No. 5,641,586, however, describes a cell with a hydrophilic substrate, which will absorb the liquid water and flood the substrate, thereby impeding transport of oxygen to the cathode catalyst.

What is needed in the art is a fuel cell power plant that ensures proper removal of the product and proton drag water from the cathode, thereby ensuring that the maximum amount of oxygen from the oxidant reactant gas stream reaches and reacts with the catalyst on the cathode side of the MEA.

DISCLOSURE OF INVENTION

The present invention is a fuel cell power plant that includes a fuel cell having a membrane electrode assembly (MEA), which is disposed between an anode support plate and a cathode support plate and wherein the anode and/or cathode support plates include a hydrophilic substrate layer. The fuel cell power plant also includes a fuel reactant gas stream, which is in fluid communication with the anode support plate's hydrophilic substrate layer, and an oxidant reactant gas stream, which is in fluid communication with the cathode support plate's hydrophilic substrate layer, and a cooling water stream, which is in fluid communication with both the anode and cathode support plate hydrophilic substrate layers. The hydrophilic substrate layer in the anode support plate enhances the migration of the cooling water to the anode side of the MEA, and the hydrophilic substrate layer in the cathode support plate improves the removal of water from the cathode side of the MEA. The hydrophilic substrate layers within both the anode and cathode support plates have a predetermined level of porosity (i.e., number of pores) and pore size. The inventors of the present invention recognized that without controlling the number of pores within the hydrophilic substrate that contain water, the water will fill 100% of the available pores, thereby preventing any migration of the reactant gases. The inventors of the present invention, therefore, recognized that controlling the pressure of the reactant gas streams and the coolant stream, controls the percentage of pores that contains water or reactant gas. The present invention utilizes a pressure differential between the coolant stream and the reactant gas streams to control the respective distribution of the streams within the pores of a hydrophilic substrate. The pressure differential is established such that a greater percentage of the pores within the hydrophilic substrate layer contain reactant gas rather than water. The present invention provides for creating a pressure differential between the reactant gas streams and the coolant stream such that the pressure of the reactant gas streams is greater than the pressure of the coolant stream. Operating the fuel cell at such pressure differential ensures that the product and proton drag water that form at the cathode catalyst layer will migrate through the cathode support plate and away from the MEA. Controlling the coolant and fuel reactant gas streams on the anode side of the MEA also ensures that the cooling water will continually migrate from the coolant stream toward the anode side of the MEA, thereby preventing the membrane from becoming dry.

Proper water balance in the cathode and anode support plates ensures that the PEM remains moist, thereby prolonging the fuel cell's life, as well as improving its electrical efficiency. Proper water removal also facilitates increased oxygen utilization within the fuel cell. Specifically, without proper water removal, a reduced portion of the available oxygen reaches the catalyst. Increasing the amount of oxygen that is available at the catalyst increases the fuel cell's performance and/or reduces the overall size of the fuel cell in order to generate a certain power rating. Although U.S. Pat. No. 5,641,586 recognized that replacing the cathode hydrophobic substrate layer with a hydrophilic substrate layer increased the cell voltage, that patent failed to discuss the importance of water removal from the cathode. Moreover, that patent failed to teach that controlling the pressure of the reactant gas streams and the coolant streams controls the filled porosity of the hydrophilic substrate, as well as reducing the water content of the catalyst layers. The present invention, in contrast, provides a means for preventing the cathode support plate from flooding, thereby ensuring that the maximum amount of oxidant reactant gas reaches the cathode side of the MEA. Hence the present invention not only improves the electrical power output capacity of a fuel cell but also increases the fuel cell's oxygen utilization, which, in turn, further improves the fuel cell's operational efficiency.

Accordingly the present invention relates to a fuel cell power plant, comprising a fuel cell, which includes an anode support plate and a cathode support plate and a membrane electrode assembly disposed between the anode and cathode support plates, wherein the membrane electrode assembly includes a polymer electrolyte membrane, wherein the anode support plate and the cathode support plate each contain a hydrophilic substrate layer having pores therein. The fuel cell power plant also includes water transport plates adjacent to the anode and cathode support plates, wherein the water transport plates have passages for the coolant stream and reactant gas streams to pass therethrough. Incorporating the water transport plates into the fuel cell enhances the fuel cell's ability to remove water from the cathode support plate and transfer water through the anode support plate to the membrane. The fuel cell power plant further includes a means for creating a predetermined pressure differential between the reactant gas streams and the coolant stream such that a greater percentage of the pores within the hydrophilic substrate layers contain reactant gas in lieu of coolant.

In other embodiments of the present invention, the anode and/or cathode support plates may contain a diffusion layer. If so, it is preferable that the diffusion layer be partially hydrophobic rather than totally hydrophobic because a partially hydrophobic diffusion layer is capable of transferring a larger percentage of liquid water than a totally hydrophobic diffusion layer, such as described in U.S. Pat. No. 5,641,586.

In a further embodiment of the present invention, a fuel cell has an anode and/or cathode support plate that includes a hydrophilic substrate layer but does not include a diffusion layer. Removing the anode diffusion layer or reducing its thickness increases the migration of water from the water transport plate to the MEA, thereby ensuring proper moisturizing of the PEM, particularly at high current densities, which in turn, further improves the electrical efficiency of the fuel cell. Removing the cathode diffusion layer or reducing its thickness reduces the distance through which the oxidant reactant gas must pass before reaching the catalyst, thereby increasing the fuel cell's oxygen utilization characteristics.

The foregoing features and advantages of the present invention will become more apparent in light of the following detailed description of exemplary embodiments thereof as illustrated in the accompanying drawings.

MODE(S) FOR CARRYING OUT THE INVENTION

Figure 1:
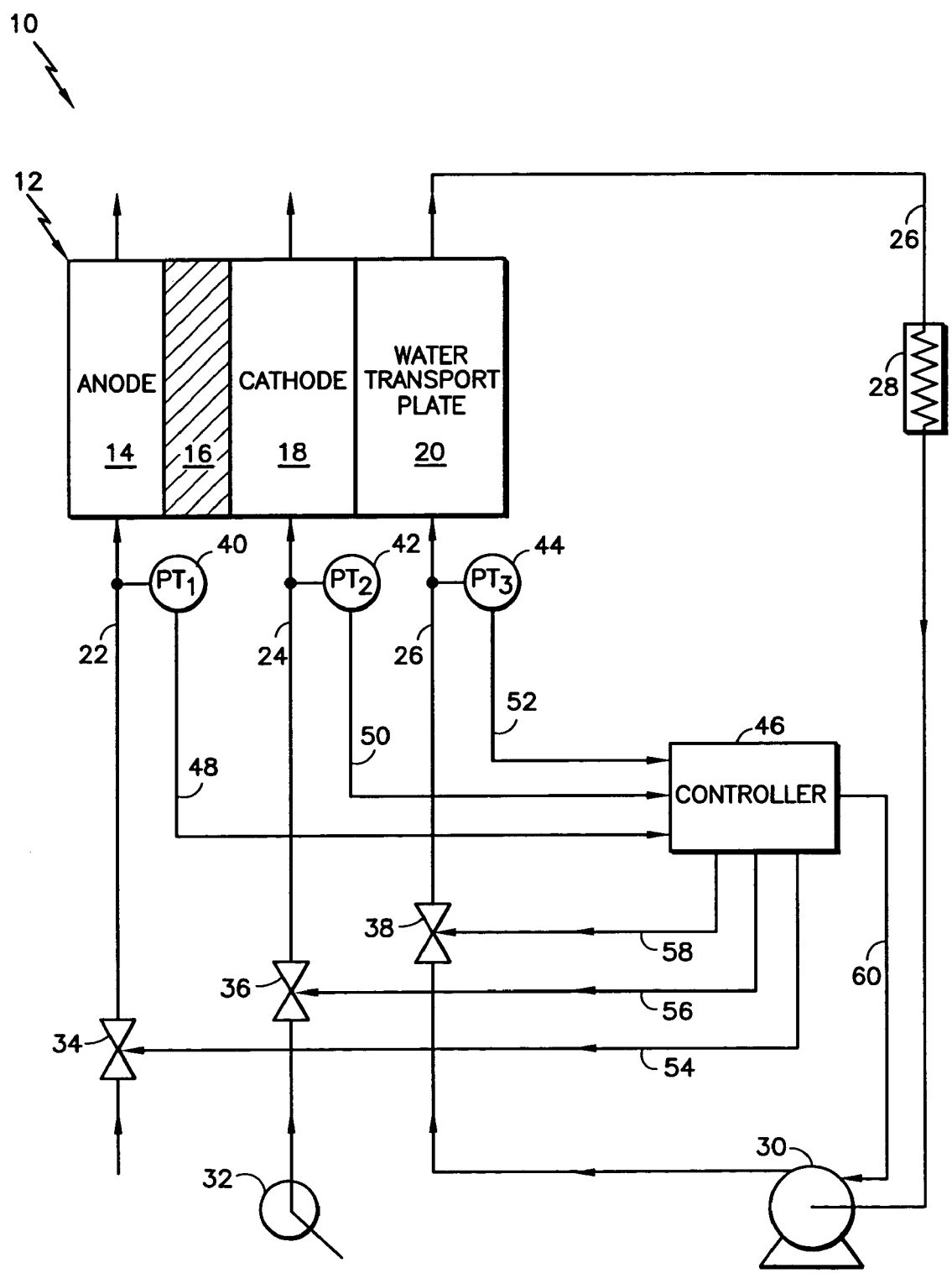
FIG. 1 illustrates a fuel cell power plant that includes a PEM fuel cell and a means for controlling the pressure of the reactant gas streams and the coolant stream.

Referring to FIG. 1, there is shown a PEM fuel cell power plant 10 that includes a fuel cell 12 and a means for controlling the pressure of the fuel reactant gas stream 22, oxidant reactant gas stream 24 and coolant stream 26. A PEM fuel cell power plant 10 typically comprises a plurality of fuel cells, which are electrically connected in series and referred to as a cell stack assembly. However, for the purpose of simplicity in explaining the present invention, the fuel cell power plant 10 only includes one fuel cell 12, but it will be understood that the fuel cell power plant 10 typically comprises a predetermined number of fuel cells 12. Each fuel cell 12 includes an anode support plate 14, a cathode support plate 18 and a membrane electrolyte assembly (MEA) 16 disposed between the anode support plate 14 and the cathode support plate 18. The fuel reactant gas stream 22 supplies the anode support plate 14 with the fuel reactant gas, such as hydrogen from a fuel supply (not shown), and the oxidant reactant gas stream 24 supplies the cathode support plate 18 with oxidant reactant gas. The oxidant reactant gas may be essentially pure oxygen derived from a pressurized oxygen container, or the oxidant reactant gas may be air that is pressurized by a compressor or an air blower. As the reactant gases pass through the fuel cells 12, product water forms in the cathode support plate 18. Also, water in the fuel reactant gas stream 22 passes through the MEA 16 and enters the cathode support plate 18.

A water transport plate 20 serves to remove the water from the cathode support plate 18 and incorporate such water into the coolant stream 26, which is typically comprised of water. The water transport plate 20 also cools the fuel cell 12. Hence the water transport plate 20 is occasionally referred to as a cooler plate. Because the coolant stream 26, fuel reactant gas stream 22 and oxidant reactant gas stream 24 are in fluid communication with each other, it is preferable to manage the water within the PEM fuel cell power plant 10. Examples of water management systems include those illustrated in U.S. Pat. Nos. 5,503,944 and 5,700,595, which are both assigned to the assignee of the present invention and hereby incorporated by reference. Both of these patents rely upon maintaining a positive pressure differential between the reactant gases and the coolant water. Operating the fuel cell power plant 10 such that the pressure of the oxidant reactant gas stream 24 is greater than the pressure of the coolant stream 26 ensures the movement of the product water from the cathode 18 toward the water transport plate 20.

Figure 2:
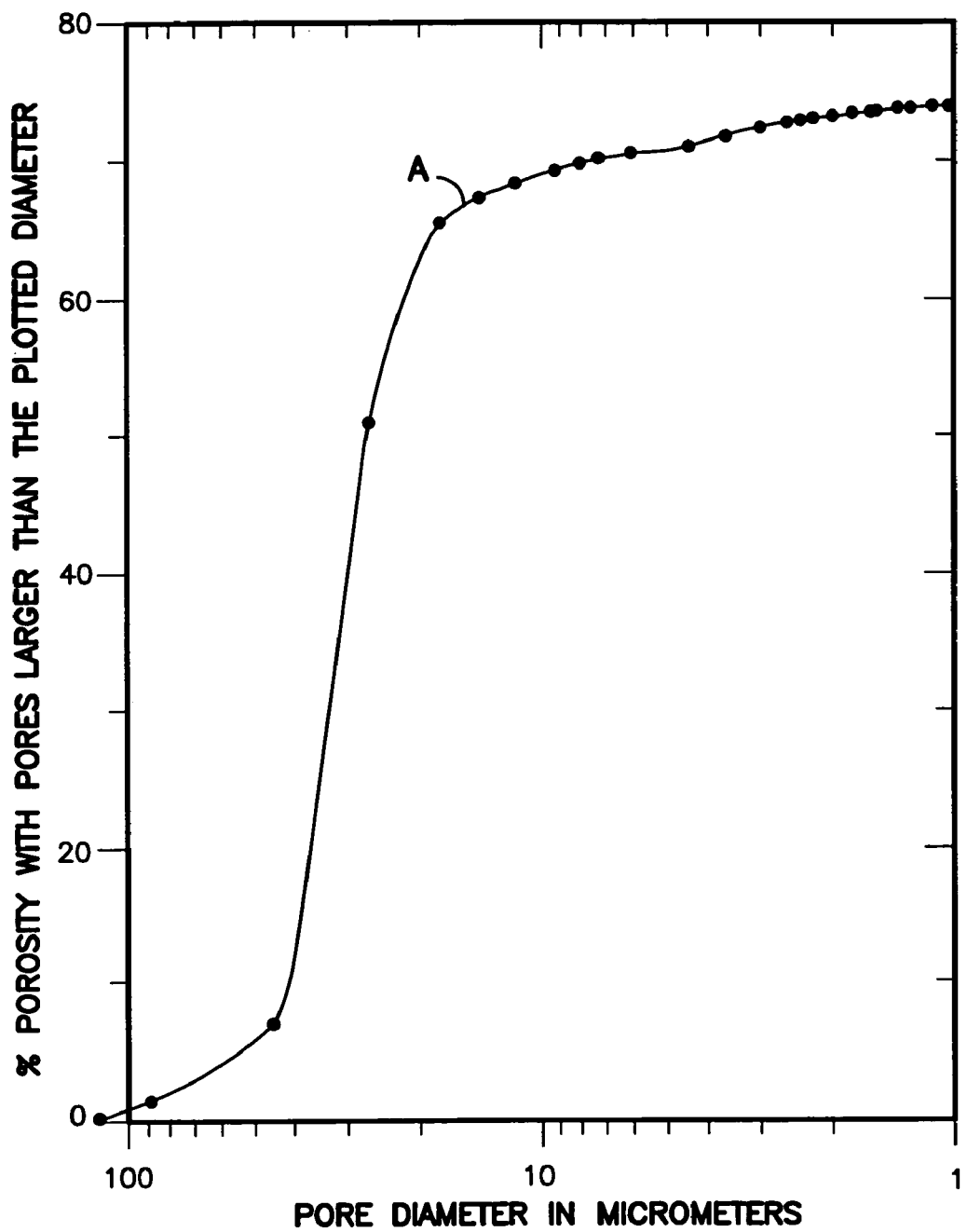
FIG. 2 is a curve that illustrates the relationship between the pore size and degree of porosity for a hydrophilic substrate layer.

More importantly, the inventors of the present invention discovered that when a hydrophilic substrate layer is included within the anode support plate 14 and/or cathode support plate 18, it is necessary to operate the fuel cell power plant 10 such that a pressure differential exists between the fuel reactant gas stream 22, oxidant reactant gas stream 24 and coolant stream 26 in order to prevent the cathode support plate 18 or anode support plate 14 from flooding. More specifically, the pressure differential establishes a preferred ratio of liquid water or coolant to reactant gas within the hydrophilic substrate. The percentage of liquid to reactant gas is a function of the pore size of the hydrophilic substrate and the pressure differential between the reactant and coolant streams. Each hydrophilic substrate has a predetermined pore size and predetermined porosity. For example, FIG. 2 is a plot of the pore diameter in micrometers (i.e., microns) versus the percentage of pores larger than the plotted pore diameter. This figure illustrates that the total porosity of the hydrophilic substrate layer was approximately 75%. In other words, about 75% of the hydrophilic substrate layer was porous. It is preferable, however, that more than half of the available pores be filled with reactant gas rather than liquid. Hence, the porosity of the hydrophilic substrate layer with pores larger than the plotted diameter should be greater than 37.5%.

Figure 3:
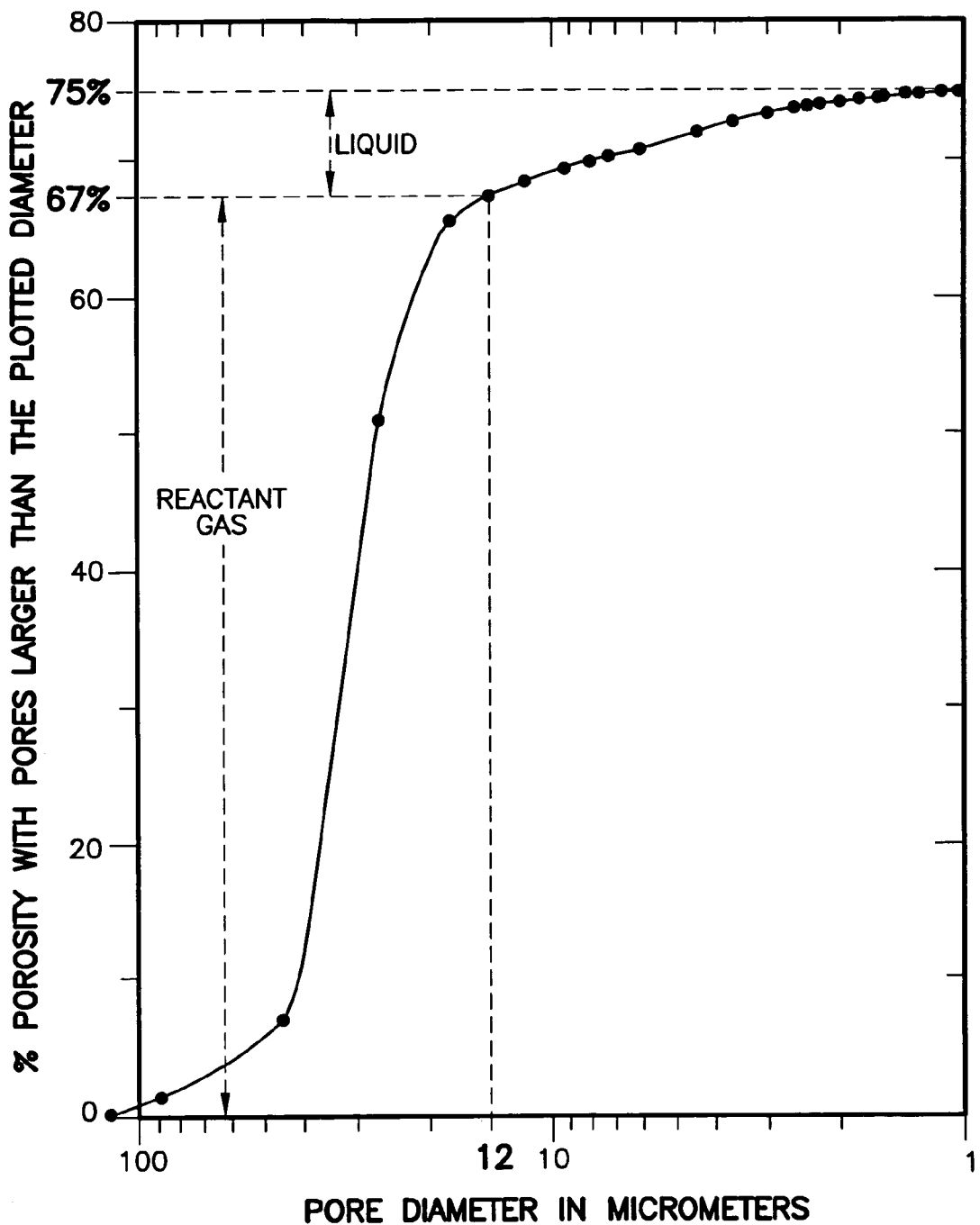
FIG. 3 illustrates the percentage of liquid and gas porosity for a given pore size based upon the curve in FIG. 2.

FIG. 2 was obtained by performing a mercury porosimetery measurement on a hydrophilic substrate layer, such as grade TGP-006 sold by Toray of America and treated with 20 milligrams of tin oxide ($SnO_2$) per gram of substrate to make it wettable. FIG. 2 illustrates the pore size distribution for a hydrophilic substrate layer. In other words, for a given pore diameter, the distance above the curve represents the percentage of pores that have a pore diameter that is less than the plotted pore diameter, and the distance below the curve represents the percentage of pores that have a pore diameter that is greater than the plotted pore diameter. For example, referring to FIG. 3, a pore having a diameter of 12 microns corresponds to a porosity of 67%. Keeping in mind that the total porosity is approximately 75%, the porosity of the substrate having pores with a diameter greater than 12 microns is about 67%, and the porosity of the substrate having pores with a diameter less than 12 microns is about 8%. Therefore, about 89% of the pores within the substrate had a diameter greater than 12 microns, and about 11% of the pores within the substrate had a diameter less than 12 microns.

Controlling the pressure differential between the coolant and the reactant gas streams, in turn, controls the percentages of liquid and reactant gas within the hydrophilic substrate because there is a relationship between the pore size and pressure differential. The relationship between the pore size and the pressure differential is determined by the following equation:

$$P_g - P_l = \frac{4\gamma\cos\theta}{D} \qquad [\text{Eq. 1}]$$

wherein, $P_g$=reactant gas pressure $P_l$=liquid pressure

γ=surface tension

θ=contact angle

D=diameter of the largest pore filled with liquid

At a temperature of about 65° C. (150° F.), the surface tension (γ) of water is approximately 65 dyne/cm. Additionally, the contact angle between water and a hydrophilic substrate is about zero. Therefore, at about 65° C. (150° F.), the difference between the reactant gas pressure ($P_g$) and the liquid pressure ($P_l$) is equal to about 30/D, wherein the pressures are measured in pounds per square inch (psi) and the diameter (D) of the pore is measured in microns.

If that pressure differential is maintained, then all pores within the hydrophilic substrate having a diameter less than the given pore diameter (D) will contain liquid and all pores within the hydrophilic substrate having a diameter greater than the given pore diameter (D) will contain reactant gas. As mentioned above, for a given pore diameter (D), the distance above the curve represents the percentage of pores that have a pore diameter that is less than the plotted pore diameter, and the distance below the curve represents the percentage of pores that have a pore diameter that is greater than the plotted pore diameter. Hence, operating the fuel cell at the appropriate pressure differential ensures that the distance above the curve represents the percentage of pores that contain liquid, and the distance below the curve represents the percentage of pores that contain reactant gas. For example, as described hereinbefore with respect to FIG. 3, the percentage of pores containing liquid is about 11%, and the percentage of pores containing reactant gas is about 89%. The ratio of coolant to reactant gas within the hydrophilic substrate is, therefore, about 1 to 9. Controlling the pressure of the coolant stream and reactant gas streams ensures that a greater percentage of the pores within the hydrophilic substrate contain oxidant reactant gas rather than coolant.

If the pressure differential decreases, the percentage of pores filled with water increases. Furthermore, in the absence of a pressure differential between the liquid pressure and the reactant gas pressure, as in U.S. Pat. No. 5,641,586, the percentage of pores filled with water will approximate 100%, thereby flooding the cathode. Flooding the cathode will prevent the oxidant reactant gas from reaching the catalyst layers because the majority of pores will be filled with water and the electrical performance will diminish.

The preferred ratio of liquid to reactant gas within the hydrophilic substrate is a function of the relationship between the pore size and the porosity for such pore size for a given hydrophilic substrate. In other words, the preferred percentage of pores filled with reactant gas and water is dependent upon the shape of the curve illustrated in FIG. 2. Referring to FIG. 2, it is preferable to have a porosity filled with reactant gas equal to or greater than point A. Point A represents the juncture at which the porosity becomes less sensitive to the change in pore size. Although the shape of the curve in FIG. 2 illustrates that at a porosity of about 67%, the porosity becomes less sensitive to the pore size, it is preferable to operate at a porosity such that the number of pores containing reactant gas is greater than the number of pores containing water. This results in a preferable mass transport of the reactants to the catalysts, while also providing a wetted path to move water from the cathode to the water transport plate. Additionally, creating a pressure differential between the fuel reactant gas stream and the coolant stream allows the water to move from the water transport plate to the PEM on the anode side of the fuel cell.

As mentioned above, the preferred percentages of pores filled with reactant gas and water is dependent upon the size of the pores within the substrate layer and the pressure differential between the reactant gas streams 22, 24 and the coolant stream. The percentage of pores containing liquid or reactant gas will be controlled by the respective coolant stream 26 and reactant gas 22, 24 streams, wherein the reactant gas streams 22, 24 will typically have a greater pressure than the coolant gas stream 26. Specifically, because the pressure of the reactant gas streams 22, 24 are typically equal to about ambient pressure, the pressure of the coolant stream 26 is less than ambient pressure. Moreover, the pressure differential between the coolant stream 26 and the reactant gas streams 22, 24 will preferably be in the range of 0.2 psi-1.7 psi.

As illustrated in FIG. 1, one such means for maintaining a positive pressure differential between the reactant gas streams 22, 24 and the coolant stream 26 comprises circulating water through the coolant stream 26, which is cooled by a heat exchanger 28 and pressurized by a pump 30. The pump 30 establishes a predetermined coolant water pressure in the coolant stream 26. This pressure may further be regulated by a variable valve 38, which is located in the coolant stream 26 just prior to the water transport plate 20. If the pump 30 is a fixed rate pump, the valve 38 will be useful for varying the coolant pressure in the event that pressure adjustments are necessary. A pressure transducer 44 is disposed downstream of the pump 30 and valve 38. The pressure transducer 44 serves to measure the pressure of the coolant water stream before it enters the water transport plate 20. The pressure transducer 44, the valve 38 and the pump 30 may be connected to a power plant microprocessor controller 46 via lines 52, 58, and 60, respectively. Coolant stream pressure input from the pressure transducer 44 will cause the controller to regulate the pump 30 and/or the valve 44 when necessary to achieve a target coolant stream pressure.

The oxidant reactant gas is delivered to the cathode support plate 18 through line 24. The line 24 may contain a variable pressure regulating valve 36 and a downstream pressure transducer 42 which measures the pressure of the oxidant gas stream as it enters the cathode support plate 18. The pressure transducer 42 is connected to the system controller 46 via line 50, and the variable valve 36 is connected to the controller 46 by line 56. When a variable compressor or pump 32 is used to pressurize an air oxidant, appropriate connections may be made with the controller 46. The controller 46 can thus make appropriate corrections in the oxidant reactant pressure when system operating conditions so dictate by varying the valve 36 or the pump/compressor 32.

The fuel reactant is fed into the anode support plate 14 by means of a line 22. The fuel reactant gas will typically be contained in a pressurized container, or in a pressurized fuel conditioning or reforming system (not shown). A variable valve 34 is operable to regulate the pressure of the fuel reactant as it enters the anode support plate 14. The fuel reactant pressure is monitored by a pressure transducer 40, which is connected to the system controller 46 by a line 48. The variable valve 34 is connected to the system controller 46 by a line 54. It is preferred to operate a fuel cell power plant at near ambient pressure because doing so removes the need to compress the air to elevated pressures and permits the use of fans or blowers to move air through the fuel cell, thereby resulting in maximum efficiency. Avoiding use of a compressor within the fuel cell power plant eliminates one source of parasite power, thereby improving the power plant's overall operating efficiency. Although the present invention is not limited to any specific operating condition, a preferred operating pressure for the reactant gases ranges from 15 to 20 psia.

Figure 4:
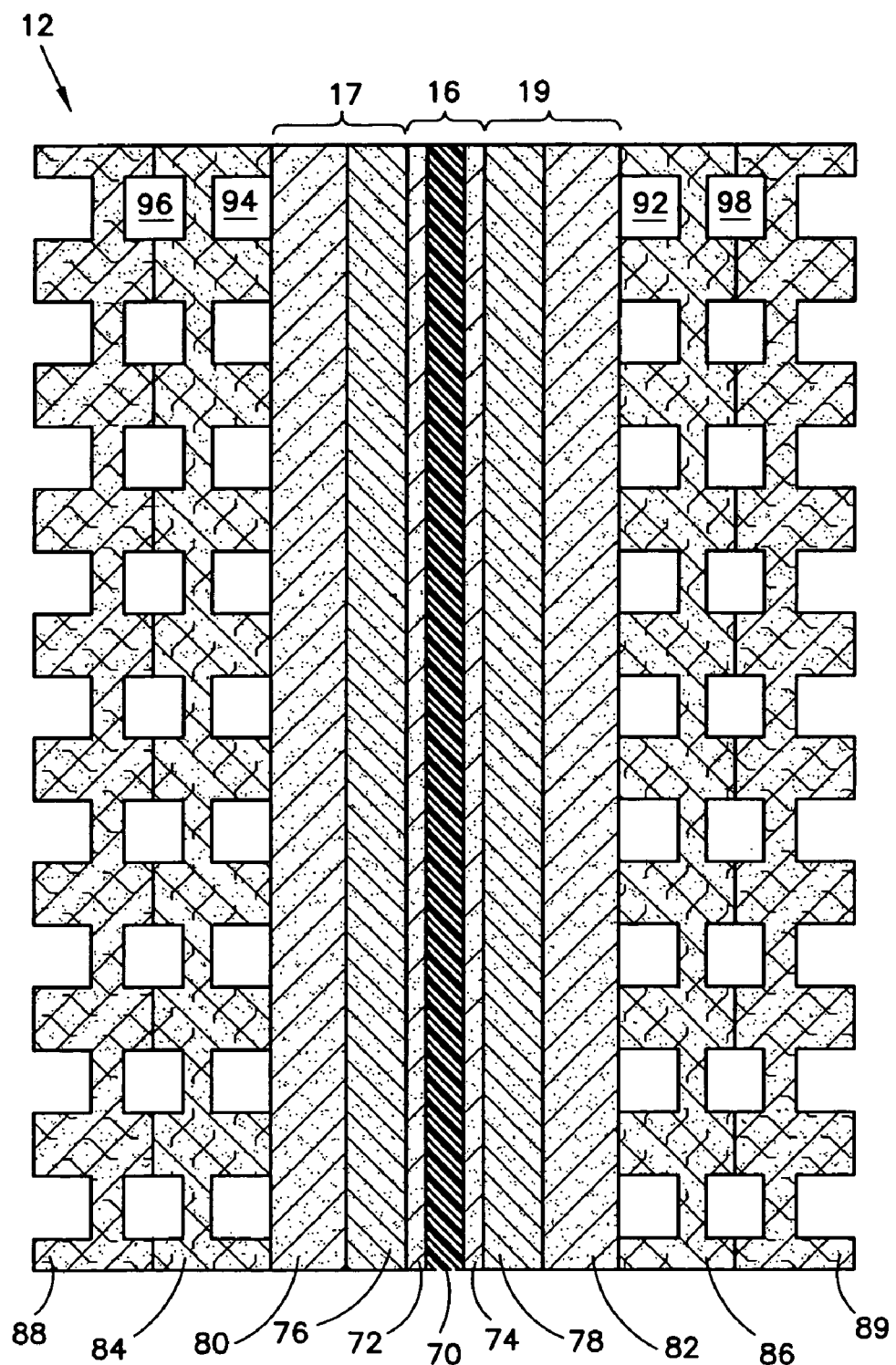
FIG. 4 illustrates a PEM fuel cell that includes hydrophobic diffusion and substrate layers in both the anode and cathode support plates of the PEM fuel cell.

Referring to FIG. 4, there is shown a cross sectional view of the fuel cell 12, which includes an MEA 16, an anode support plate 17 and a cathode support plate 19. The MEA 16 comprises a polymer electrolyte membrane ("PEM") 70, an anode catalyst 72 and a cathode catalyst 74. The anode catalyst 72 and the cathode catalyst 74 are secured on opposite sides of the PEM 70.

The anode support plate 17 and cathode support plate 19 include hydrophobic diffusion layers 76, 78 and hydrophobic substrate layers 80, 82. The anode diffusion layer 76 is adjacent to the anode catalyst 72, and the anode substrate layer 80 is adjacent to a side of the anode diffusion layer 76 opposite the anode catalyst 72. The anode diffusion layer 76 and the hydrophobic anode substrate layer 80 allow the fuel reactant gas, which passes through the passageway 94 in the water transport plate 84, and the water, which passes through the passageway 96, to reach the anode catalyst 72. The fuel cell 12 also includes a hydrophobic cathode diffusion layer 78 and a hydrophobic cathode substrate layer 82 for passing the oxidant reactant gas from the passageway 92 in the water transport plate 86 to the cathode catalyst 74. The cathode diffusion layer 78 is adjacent to the cathode catalyst 74, and the cathode substrate layer 82 is adjacent to a side of the cathode diffusion layer 78 opposite the cathode catalyst 74. The cathode diffusion layer 78 and the hydrophobic cathode substrate layer 82 allow the oxidant reactant gas, which passes through the passageway 92 in the water transport plate 86 to reach the cathode catalyst 74. The hydrophobic cathode diffusion layer 78 and the hydrophobic cathode substrate layer 82 allow the product water, which forms in the cathode catalyst 74, to migrate toward the water transport plate 86.

The diffusion layers 76, 78 are applied to both the anode and cathode substrate layers 80, 82, within the anode support plate 17 and cathode support plate 19, by procedures well known in the art. A preferable procedure is that which is described in U.S. Pat. No. 4,233,181, which is owned by the assignee of the present invention and hereby incorporated by reference. The diffusion layers 76, 78 are typically constructed of porous conductive layers that are rendered hydrophobic or partially hydrophobic. One such porous conductive layer is a carbon particulate. It is preferable that the carbon particulate have a pore size less than or equal to 4 microns and a porosity equal to or greater than 60%. In order to render the diffusion layer hydrophobic, a hydrophobic polymer is mixed with a porous carbon black layer. The resultant is subsequently heated to about the melting point of the hydrophobic polymer, as is known in the art. Suitable hydrophobic polymer include fluoropolymers, such as, polytetraflouroethylene (PTFE), fluorinated ethylene propylene (FEP), polytetrafluoroethylene-co-perfluromethyl vinylether (PFA), copolymers of ethylene and tetrafluroethylene (ETFE), copolymers of ethylene and chlorotrifluroethylene (ECTFE), polyvinyldene fluride (PVDF), polyvinyl fluoride (PVF), and amorphous fluropolymers (TEFLON AF). The distinguishing characteristic of such fluoropolymers is their critical surface energy, and it is preferable to select a fluoropolymer having a critical surface energy less than or equal to 30 dyne per centimeter. An example of such a diffusion layer includes a porous carbon-TEFLON® polytetrafluoroethylene (PTFE) particulate composite having a thickness of about 75 to 100 microns (0.003 to 0.004 inches), and preferably about 0.0035 inches, with a mass of about 12.1 milligrams per square centimeter. More specifically, the anode and cathode diffusion layers 76, 78 include a porous carbon layer distributed by the Cabot Corporation under the product identification name of VULCAN XC-72 which is rendered hydrophobic by adding polytetrafluoroethylene (PTFE), such as the type manufactured by E. I. dupont deNemours of Wilmington, Del. under the tradename TEFLON®. It is preferable to use an amount of TEFLON® polytetrafluoroethylene having the grade "TFE-30" such that the anode and cathode diffusion layers 76, 78 comprise about 50% VULCAN XC-72 and 50% TEFLON® polytetrafluoroethylene. The anode and cathode diffusion layers 76, 78 are also typically heated to approximately 343° C. (650° F.) for about five (5) minutes, rendering such layers hydrophobic.

The anode and cathode substrate layers 80, 82 are typically constructed of a porous carbon-carbon fibrous composite having a thickness of about 150 to 175 microns (0.006 to 0.007 inches) a porosity of about of about 65% to about 75%. An example of such a substrate is that distributed by the Toray Company of New York, N.Y. with grade identification TGP-H-060. The anode and cathode substrate layers 80, 82 are typically rendered hydrophobic by combining polyfluorinated ethylene propylene, such as the type manufactured by E. I. dupont deNemours of Wilmington, Del. under the tradename TEFLON®, into the substrate. It is preferable to use TEFLON® polyfluorinated ethylene propylene having the grade "FEP-121" such that the anode and cathode substrate layers 80, 82 comprise about 165 milligrams of TEFLON® polyfluorinated ethylene propylene for every cubic centimeter of TGP-H-060.

As shown in FIG. 4, the anode water transparent plate 84 is adjacent to the anode support plate 17, and the cathode water transport plate 86 is adjacent to the cathode support plate 19. The anode and cathode water transport plates 84, 86 may be structured and/or oriented to cooperate with adjacent water transport plates 88, 89 such that the passageways 96 and 98 simultaneously serve as the coolant stream for both the anode of one cell and cathode of the next cell.

The water transport plates 84, 86, 88, 89 are typically porous graphite having a mean pore size of approximately two (2) to three (3) microns and a porosity of about 35% to 40%. It is preferable to make the water transport plates 84, 86, 88, 89 hydrophilic by treating them with tin oxide ($SnO_2$) such as described in U.S. Pat. No. 5,840,414, which is owned by the assignee of the present invention and hereby incorporated by reference.

Figure 5:
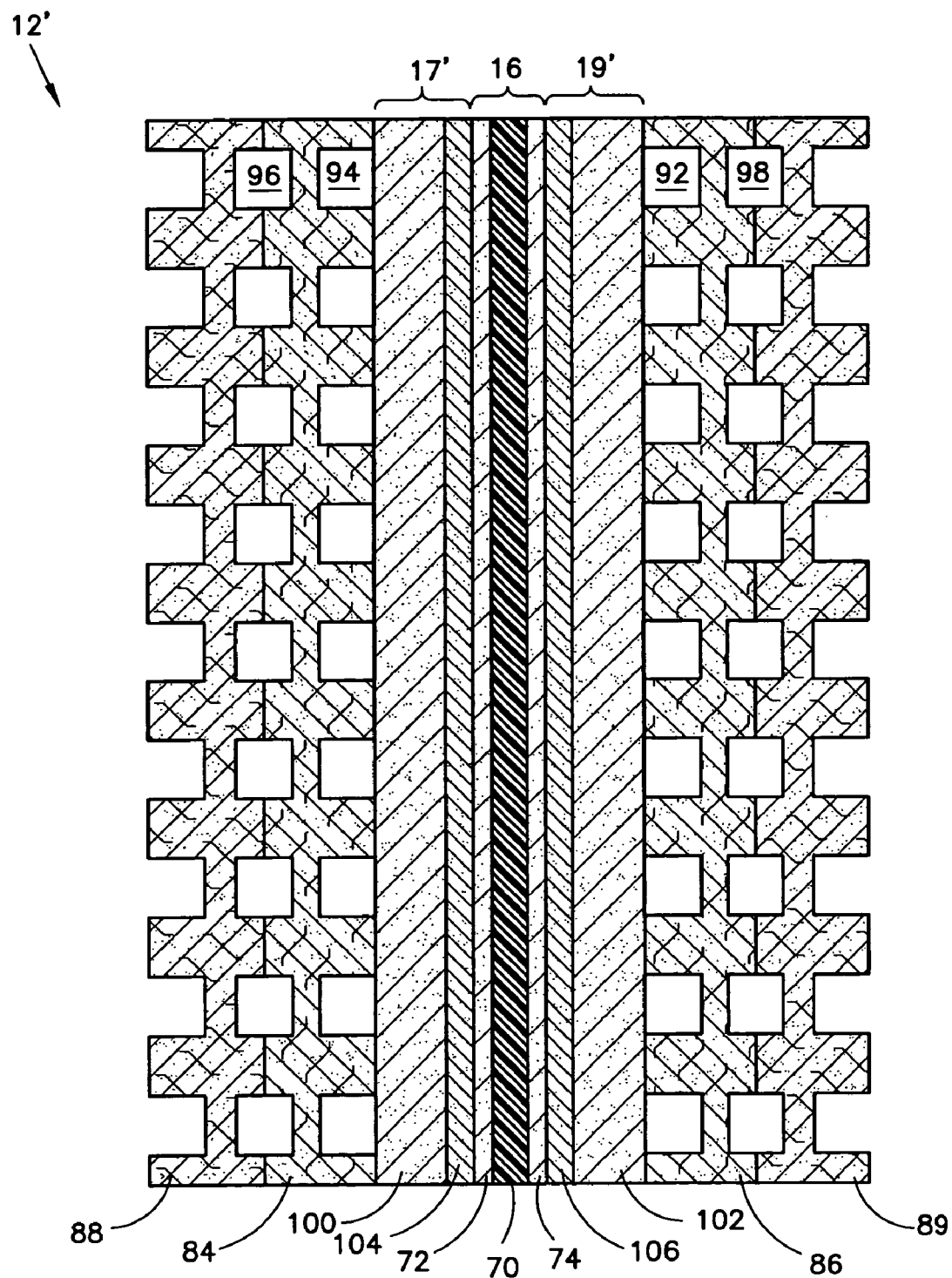
FIG. 5 illustrates a PEM fuel cell that includes a hydrophobic diffusion layer and a hydrophilic substrate layer in both the anode and cathode support plates of the PEM fuel cell.
Figure 12:
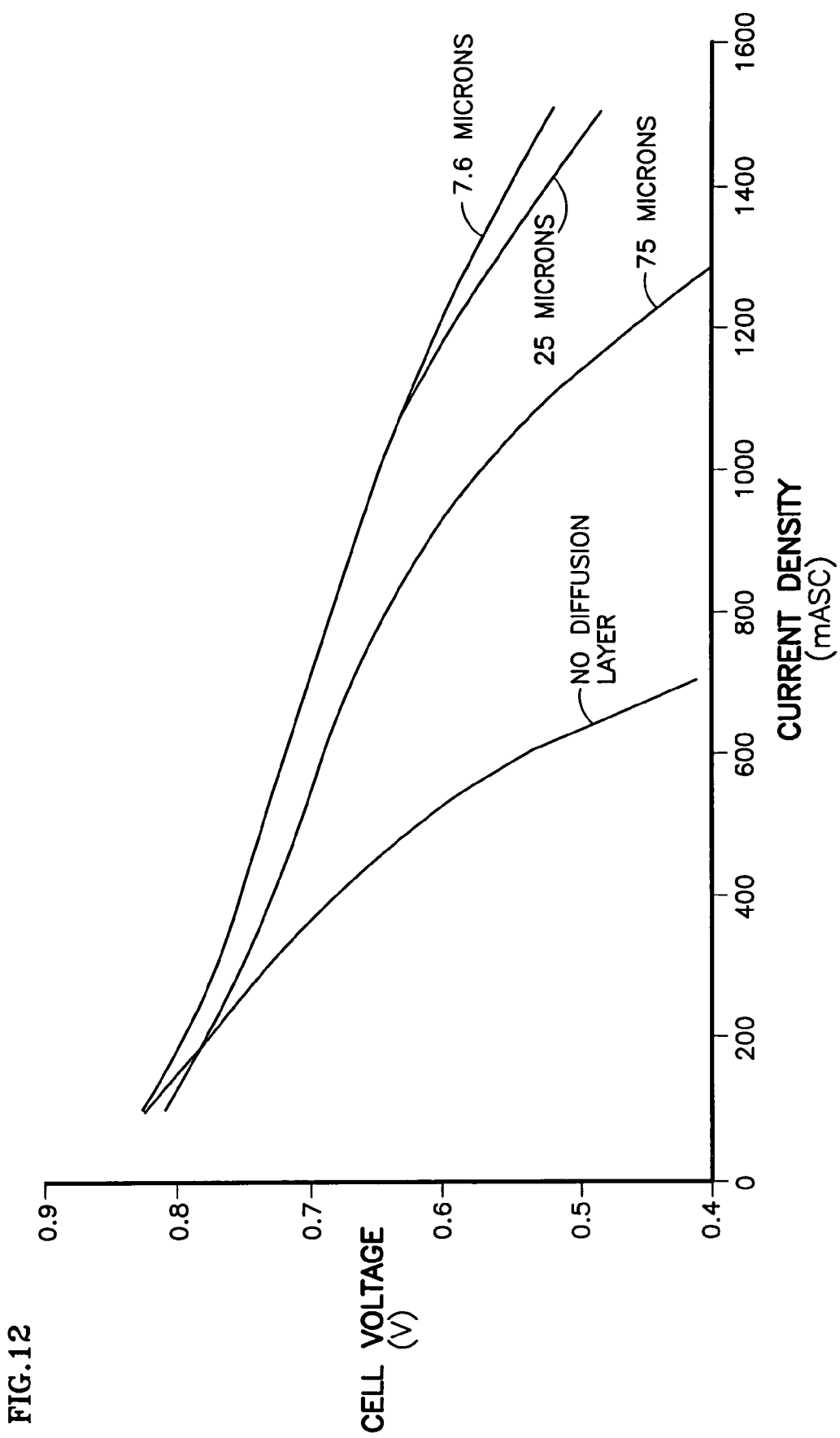
FIG. 12 is a graph of the current density versus the cell voltage for diffusion layers of various thicknesses.

Referring to FIG. 5, there is shown an alternative embodiment of a fuel cell 12'. The fuel cell 12' in FIG. 5 differs from the fuel cell 12 in FIG. 4, in that the anode support plate 17 and cathode support plate 19 of the fuel cell 12 in FIG. 4 comprise hydrophobic diffusion layers 76, 78 and hydrophobic substrate layers 80, 82, but the anode support plate 17' and cathode support plate 19' in the fuel cell 12' in FIG. 5 comprise partially hydrophobic diffusion layers 104, 106, and hydrophilic substrate layers 100, 102 adjacent to water transport plates 84, 86 respectively. Continuing to refer to FIG. 5, in addition to replacing the hydrophobic substrate layers 80, 82 with hydrophilic substrate layers 100, 102, the diffusion layer thickness is also reduced. For example, the hydrophobic diffusion layers 76, 78 of FIG. 4 are preferably about 87.5 microns (0.0035 inches), but the partially hydrophobic diffusion layers 104, 106 of FIG. 5 are preferably in the range from about five microns (0.0002 inches) to less than 25.0 microns (0.0009 inches). A plot of cell performance for several diffusion layer thicknesses is shown in FIG. 12. It may also be preferable to reduce the amount of TEFLON® polytetrafluoroethylene (grade "TFE-30") to 10%, in lieu of 50%, along with reducing the mass of the diffusion layer to about 2.0 to 5.0 milligrams per square centimeter of VULCAN XC-72.

The diffusion layer in FIG. 5 is made thinner than the diffusion layer in FIG. 4 by reducing both the carbon and PTFE content of the carbon diffusion layer. Specifically, prior art diffusion layers are typically made from a 50 weight percent mixture of carbon black and a hydrophobic polymer. These diffusion layers are totally hydrophobic with essentially 100% of their void volume filled with reactant gases. This results in a desirable characteristic for diffusing reactants to the catalysts but creates a significant barrier to removal of liquid product water.

A partially hydrophobic diffusion layer is made with a lower TEFLON® PTFE content. This creates a diffusion layer, with a void volume that is partially filled with reactant gas and partially filled with water. The precise ratios of gas volume to water volume are dependent upon the TEFLON® PTFE content and the temperature at which the TEFLON® PTFE is heat treated. Increasing the wetted volume of the diffusion layer within the cathode aids removal of the product water from the cathode. Also, increasing the wetted volume of the diffusion layer within the anode assists in transferring liquid water to the anode side of the PEM. The wetted volume of the diffusion layer is increased such that the diffusion layer's ability to transfer water is increased, but the non-wetted volume is such that the diffusion layer has sufficient volume for the diffusion of the reactant gases to and/or from the catalyst layers. For the purposes of this invention "partially hydrophobic layer" shall mean a layer having a void volume that is capable of being partially filled by water and by gas. It is preferable, therefore, to have a partially hydrophobic diffusion layer with a thickness ranging from 0.0005 inches to 0.002 inches.

Continuing to refer to FIG. 5, employing a partially hydrophobic diffusion layer 106 and a hydrophilic substrate layer 102 in the cathode support plate 19' enhances water removal from the cathode catalyst layer 74 toward the water transport plate 86, thereby preventing the cathode substrate 102 from flooding with water. Additionally, employing a partially hydrophobic diffusion layer 104 and a hydrophilic substrate layer 100 in the anode support plate 17' enhances water migration from the water transport plate 84 toward the anode catalyst layer 72, thereby preventing the anode catalyst layer 72 and PEM 70 from drying out. The base material of the hydrophilic substrate layers 100, 102 are carbon-carbon fibrous composite. In order to enhance the ability of the substrate layers 100, 102 to transfer water to or from the relevant catalyst layers 72, 74, the pores of the substrate layers 100, 102 are rendered hydrophilic by partially filling such pores with appropriate metal oxide or hydroxide compounds. Examples of such metal oxide and hydroxide compounds include tin oxide ($SnO_2$), aluminum oxide ($Al_2O_3$), niobium oxide ($Nb_2O_5$), ruthenium oxide ($RuO_2$), tantalum oxide ($Ta_2O_5$), titanium oxide ($TiO_2$), zinc oxide and zirconium oxide, and mixtures thereof. In lieu of these metal oxides, hydroxides or oxyhydroxides could be used with the same metals. Alternatively, the substrate layers 100, 102 may also be made wettable by chemical or electrochemical oxidation of the surface of the carbon. Another alternative includes treating and/or coating the interior surface of the substrate with a wettable polymer, such as melamine formaldehyde produced by Cytec Industries of West York, United Kingdom.

The hydrophilic substrate layers 100, 102 are comprised of a porous carbon-carbon fibrous composite having a thickness of about 175 microns (0.007 inches) and a porosity of about of about 75% with an average pore size of about 27 microns to 37 microns. As discussed above, an example of such a substrate is that distributed by the Toray Company of New York, N.Y. with grade identification TGP-H-060. Adding about 20 to 50 mg of tin oxide ($SnO_2$), and preferably 25 to 35 mg, for every gram of TGP-H-060, renders the substrate layers 100, 102 hydrophilic.

For example, a Toray TGP-H-060 substrate was made hydrophilic by depositing approximately 20 milligrams (mg) of tin oxide per gram of substrate onto the interior surface of the substrate. Specifically, 66 milliliters (ml) of 100 weight percent 2-propanol and 350 ml of 33 weight percent 2-propanol in water was added to 134 ml of 1 molar $SnCl.2$ $NH_3$ solution in a 2,000 ml beaker. Thereafter, 33 ml of 3M ammonium hydroxide was added dropwise over a fifteen (15) minute period while stirring vigorously. In a second beaker, containing 170 ml of 33 weight percent 2-propanol in water, the pH was adjusted in the second beaker to about 1.3 to 1.4 by adding the appropriate amount of hydrochloric acid. While stirring the solution in the first beaker, the solution in the second beaker was slowly added to the first beaker. The substrate was then immersed in the combined solution. After removing the substrate from the combined solution, the substrate was air dried at room temperature for thirty (30) minutes, before being air dried for thirty (30) minutes at 115° C. (240° F.) and baked in air at 360° C. (680° F.) for twelve (12) hours.

Figure 6:
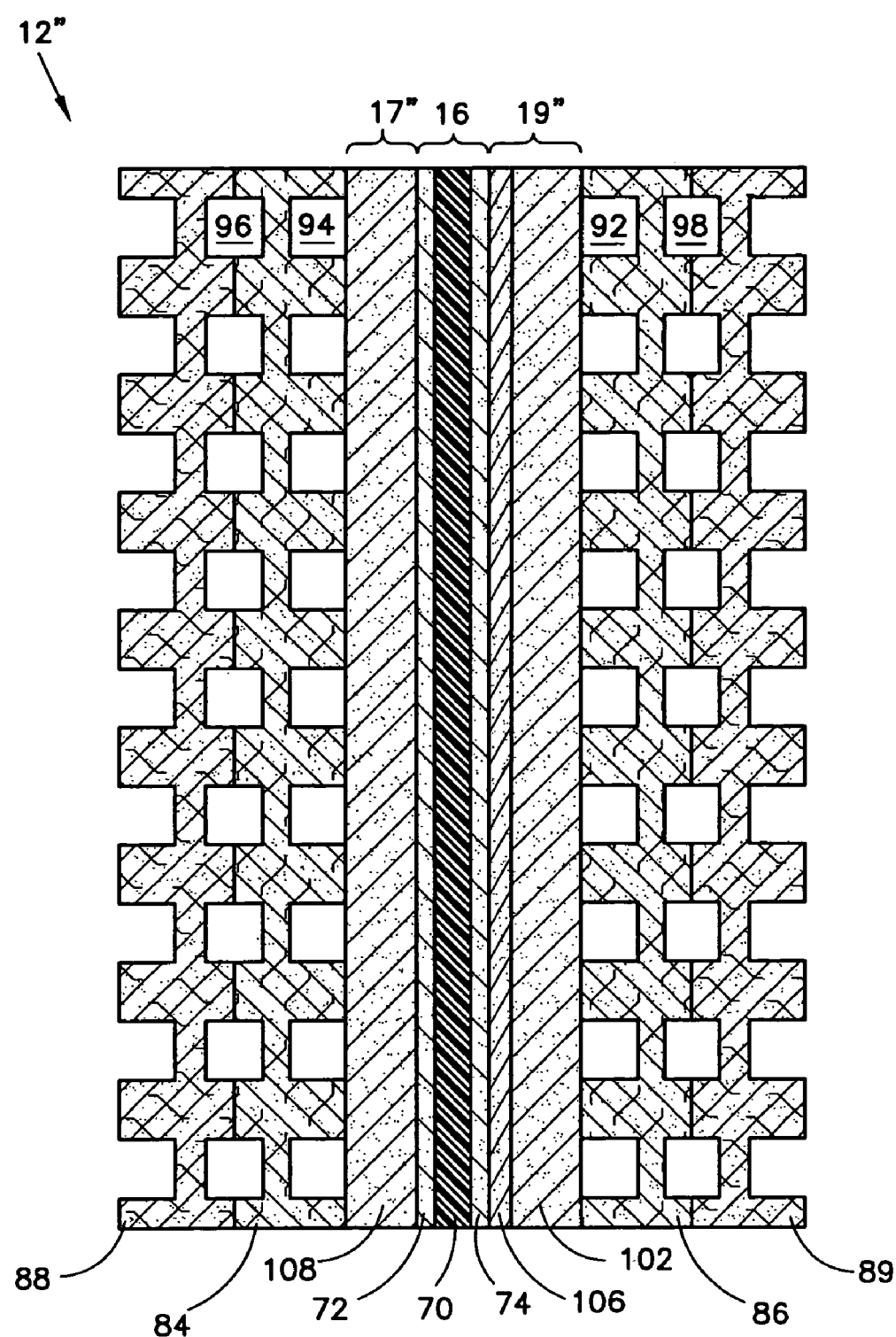
FIG. 6 illustrates a PEM fuel cell that includes a hydrophobic diffusion layer and a hydrophilic substrate layer in the cathode support plate of the PEM fuel cell and only a hydrophilic substrate layer in the anode support plate.

Referring to FIG. 6, there is shown an alternative embodiment of a fuel cell 12". The fuel cell 12" in FIG. 6 differs from the fuel cell 12 in FIG. 4, in that the anode support plate 17 and cathode support plate 19 of the fuel cell 12 in FIG. 4 comprise hydrophobic diffusion layers 76, 78 and hydrophobic substrate layers 80, 82, respectively, but the cathode support plate 19" in the fuel cell 12" in FIG. 6 comprises a partially hydrophobic diffusion layer 106, and a hydrophilic substrate layer 102 adjacent to the water transport plate 86. Moreover, the anode support plate 17" of FIG. 6 includes a hydrophilic substrate layer 108 adjacent to the water transport plate 84, but does not include a diffusion layer. Avoiding use of the diffusion layer on the anode support plate further increases the performance capability of the fuel cell by removing all hydrophobic or partially hydrophobic barriers to the transport of liquid water from the anode water transport plate 84 to the PEM 70.

Figure 7:
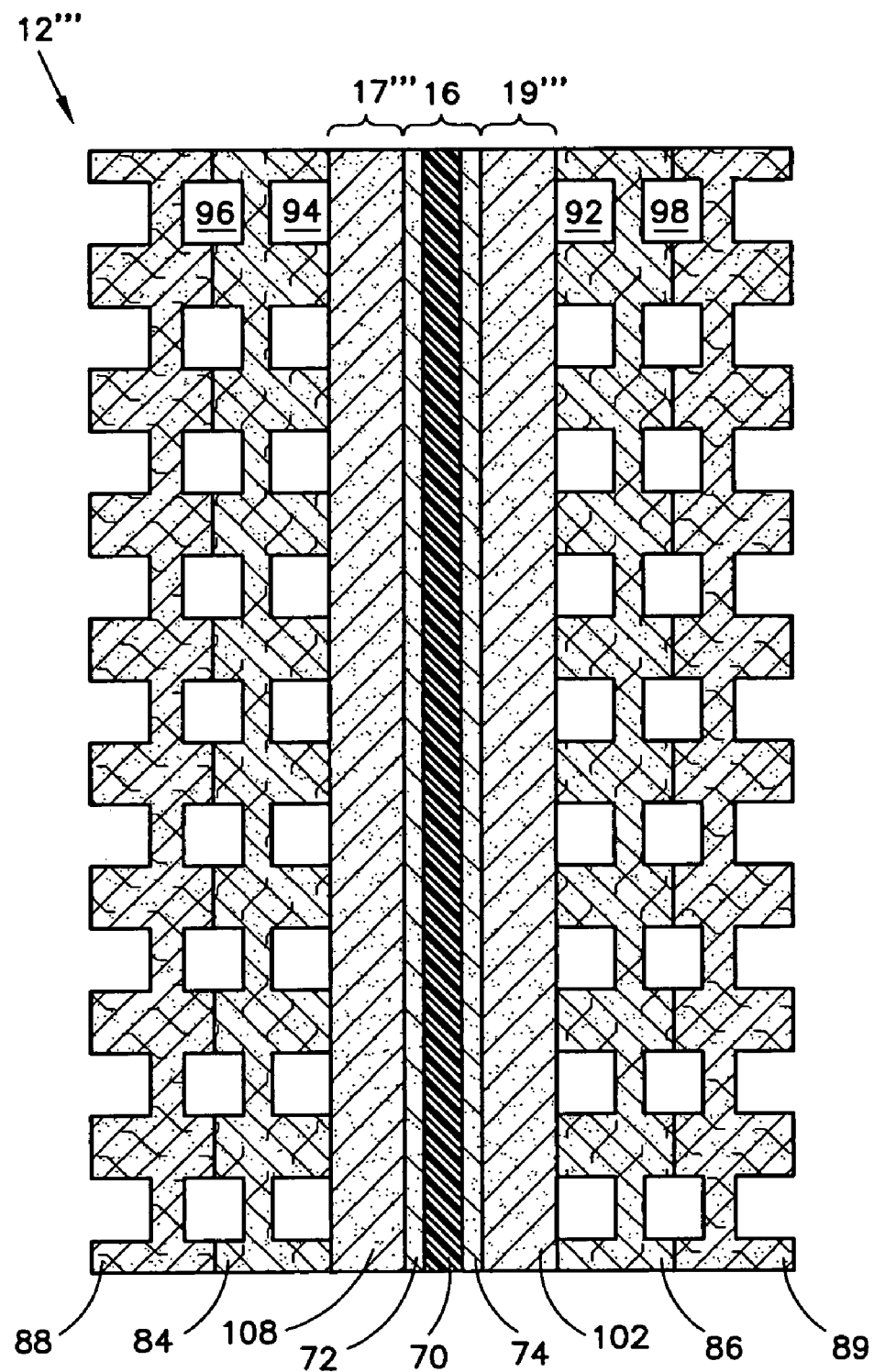
FIG. 7 illustrates a PEM fuel cell that includes only a hydrophilic substrate layer in the anode and cathode support plates of the PEM fuel cell.

Referring to FIG. 7, there is shown an alternative embodiment of a fuel cell 12'''. The fuel cell 12''' in FIG. 7 differs from the fuel cell 12 in FIG. 4, in that the anode support plate 17 and cathode support plate 19 of the fuel cell 12 in FIG. 4 comprise hydrophobic diffusion layers 76, 78 and hydrophobic substrate layers 80, 82, respectively, but the cathode support plate 19''' in the fuel cell 12''' in FIG. 7 only comprises a hydrophilic substrate layer 102 adjacent to the water transport plate 86. Moreover, the anode support plate 17''' of FIG. 7 includes a hydrophilic substrate layer 108 adjacent to the water transport plate 84, but does not include a diffusion layer. The anode catalyst layer 72 and the cathode catalyst layer 74 in FIGS. 4 to 7 are of the generic type called a flooded thin film catalyst layer. Such catalyst layers are described in U.S. Pat. No. 5,211,984, which is hereby incorporated by reference. Alternatively, the anode catalyst layer 72 and the cathode catalyst layer 74 may be of the generic type called a gas diffusion catalyst layer as described in U.S. Pat. No. 5,501,915, which is also hereby incorporated by reference. Removing the diffusion layer from the cathode may also increase the performance of the fuel cell because the oxidant reactant gas will have to travel through fewer layers to reach the cathode catalyst layer 74.

Figure 8:
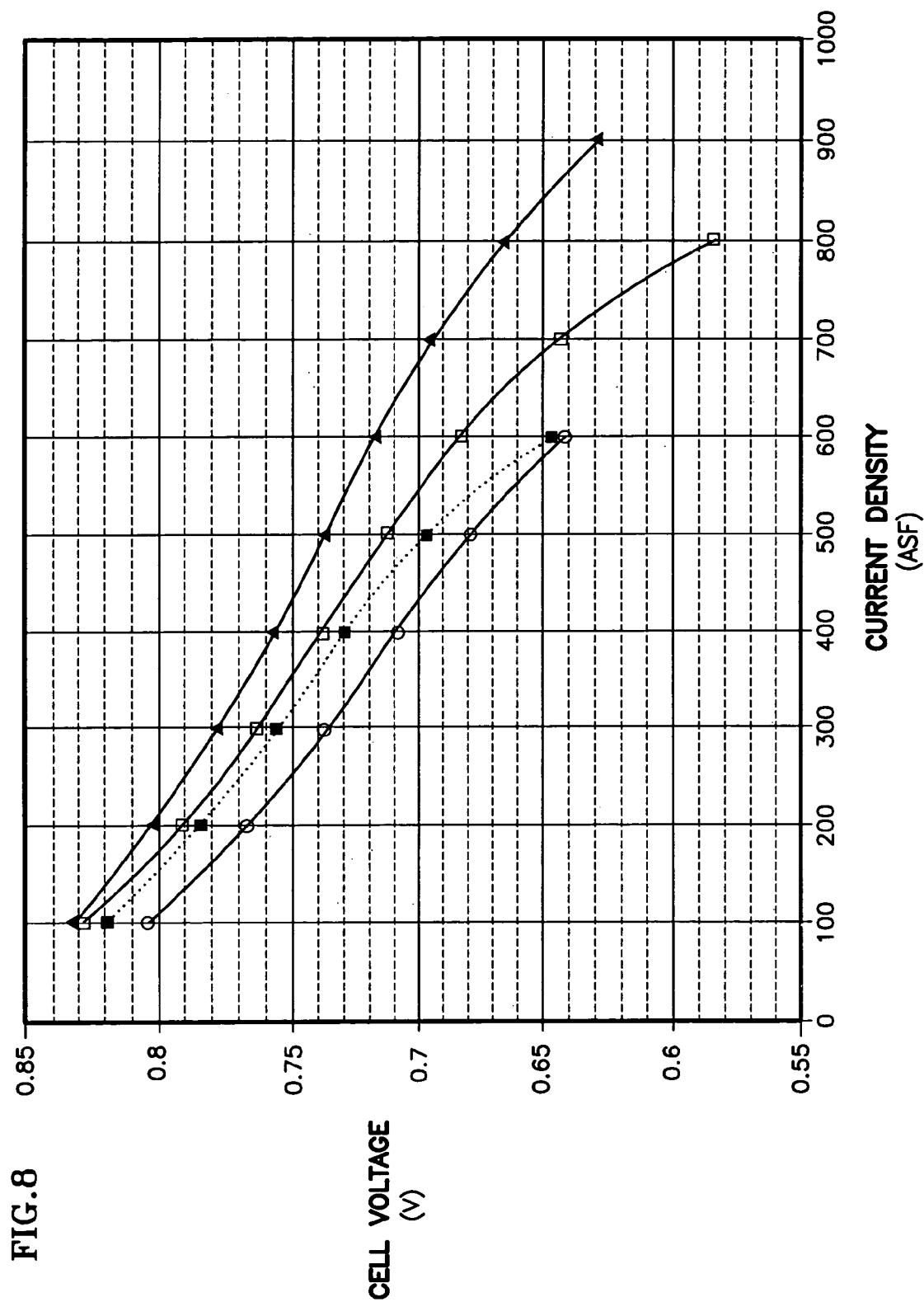
FIG. 8 is a graph of the current density versus the cell voltage for various fuel cell configurations illustrated in Table 1.

Referring to FIG. 8, there is shown a graph of the current density versus the cell voltage for various fuel cell configurations illustrated in Table 1.

TABLE 1

| | Anode | | Cathode | |
|---|---|---|---|---|
| Experiment | Diffusion Layer | Substrate Layer | Diffusion Layer | Substrate Layer |
| ○ | Hydrophobic | Hydrophobic | Hydrophobic | Hydrophobic |
| ■ | None | Hydrophilic | Hydrophobic | Hydrophobic |
| □ | None | Hydrophilic | Partially Hydrophobic | Hydrophobic |
| ▲ | None | Hydrophilic | Partially Hydrophobic | Hydrophilic |

These various fuel cell configurations illustrate how altering the construction of the fuel cell affects its performance. Specifically, the fuel cell configurations are designated by the symbols ○, ■, □ and ▲. The MEA 16 that was used in all of the cell configurations included a 15 micron PEM electrolyte within a membrane electrode assembly acquired from W. L Gore and Associates, Inc. of Elkton, Md. as product identification number "PRIMEA-5560." The fuel cell designated by the symbol ○ included an anode support plate, comprising a hydrophobic diffusion layer and a hydrophobic substrate layer, and a cathode support plate, comprising a hydrophobic diffusion layer and a hydrophobic substrate layer. Specifically, the configuration of the fuel cell designated by the symbol ○ was described hereinbefore in reference to FIG. 4. More specifically, the fuel cell designated by the symbol ○ contained an anode support plate 17 and cathode support plate 19 having 90 micron (0.0035 inch) thick hydrophobic diffusion layers 76, 78 constructed of porous carbon-TEFLON® polytetraflouroethylene (PTFE) composite, with a mass of about 12.1 milligrams per square centimeter and containing about 50% PTFE. The anode support plate 17 and cathode support plate 19 also had 175 micron (0.007 inch) porous carbon-carbon fibrous composite substrate layers 80, 82 having a porosity of about 75% and mean pore size of approximately 30 microns. The substrate layers 80, 82 were rendered hydrophobic by treating such substrates with about 165 grams of polytetraflouroethylene (PTFE) for every cubic centimeter of porous carbon-carbon fibrous composite.

Continuing to refer to FIG. 8, the fuel cells designated by the symbols ■, □ and ▲ all contained an anode support plate comprising a hydrophilic substrate layer without comprising a diffusion layer. Specifically, the anode support plate 17 within these three fuel cells only contained a 175 micron (0.007 inch) hydrophilic substrate layer 80. The hydrophilic substrate layer 80 was constructed of a porous carbon-carbon fibrous composite having a porosity of about 75% and a mean pore size of approximately 30 microns. The porous carbon-carbon fibrous composite was rendered hydrophilic by adding about 26.2 mg of tin oxide ($SnO_2$) for every gram of carbon-carbon fibrous composite.

The fuel cell designated by the symbol ■ also included a cathode support plate 19 comprising a hydrophobic diffusion layer and a hydrophobic substrate layer. More specifically, this fuel cell contained a cathode support plate 19 having 90 micron (0.0035 inch) thick hydrophobic diffusion layer 78 constructed of porous carbon-polytetrafluroethylene (PTFE), with a mass of about 12.1 milligrams per square centimeter and containing about 50% PTFE. The cathode's hydrophobic substrate layer 82 was a 175 micron (0.007) inch porous carbon-carbon fibrous composite having a porosity of about 75%. The substrate layer 82 was rendered hydrophobic by treating it with about 165 mg of PTFE for every cubic centimeter of porous carbon-carbon fibrous composite.

Continuing to refer to FIG. 8, the fuel cell designated by the symbol □ included a cathode support plate comprising a partially hydrophobic diffusion layer and a hydrophobic substrate layer. Specifically, the fuel cell designated by the symbol □ contained a cathode support plate 19 having a 17.5 micron (0.0007 inch) thick partially hydrophobic diffusion layer 78 constructed of porous carbon-polytetraflouroethylene (PTFE) particulate, with a mass of about 2.4 milligrams per square centimeter and containing about 10% PTFE. The cathode support plate 19 also had 175 micron (0.007 inch) porous carbon-carbon fibrous composite substrate layer 82 having a porosity of about 75% and a means pore size of approximately 30 microns, and was rendered hydrophobic by treating with about 165 milligrams of polytetraflouroethylene for every cubic centimeter of porous carbon-carbon fibrous composite.

Still referring to FIG. 8, the fuel cell designated by the symbol ▲ included a cathode support plate comprising a partially hydrophobic diffusion layer and a hydrophilic substrate layer. Specifically, the fuel cell designated by the symbol ▲ contained a cathode support plate 19 having a 15.0 micron (0.0007 inch) thick partially hydrophobic diffusion layer 78 constructed of porous carbon-polytetraflouroethylene (PTFE) particulate, with a mass of about 2.2 milligrams per square centimeter and containing about 10% PTFE by weight. The cathode support plate 19 also had 175 micron (0.007 inch) porous carbon-carbon fibrous composite substrate layer 82 having a porosity of about 75% and a mean pore size of approximately 30 microns, and rendered hydrophilic by loading such substrate with about 20.9 milligrams (mg) of tin oxide ($SnO_2$) for every gram of porous carbon-carbon fibrous composite, thereby rendering the porous carbon-carbon fibrous composite hydrophilic.

Each of the fuel cell configurations, designated by the symbols ○, ■, □ and ▲, were placed in a fuel cell fueled by a hydrogen reactant gas stream and an air stream, serving as the oxidant reactant gas stream. The fuel cells utilized about 80% of the hydrogen and about 40% of the air. The fuel cells operated at about 65° C. and about ambient pressure. Additionally, in order to properly manage the product water, formed by the chemical reaction between the hydrogen and air, the pressure differential between the reactant gas streams and the coolant stream was about two (2) psi. Each fuel cell operated for a period of ten (10) to twelve (12) days, and the graph shown in FIG. 8 illustrates the current density versus the cell voltage for each fuel cell configurations over such time.

The fuel cell designated by the symbol ○ had a hydrophobic anode diffusion layer, and the fuel cells designated by the symbols ■, □, and ▲ did not contain an anode diffusion layer. The data in FIG. 8 illustrates that the fuel cells designated by the symbols ■, □, and ▲ had a greater voltage level for a given current density compared to the fuel cell designated by the fuel cell designated by the symbol ○.

Therefore, removing the diffusion layer within the anode could increase the fuel cell's electrical performance.

The fuel cell configurations, designated by the symbols ■, □, and ▲ also had an anode support plate that contained a hydrophilic substrate layer, and the fuel cell designated by the symbol ○ had an anode support plate that contained a hydrophobic substrate layer. The fuel cells designated by the symbols ■, □, and ▲ had a greater voltage level for a given current density compared to the fuel cell designated by the fuel cell designated by the symbol ○. Therefore, replacing the anode hydrophobic substrate layer with a hydrophilic substrate layer may improve the electrical performance of the fuel cell. The electrical performance of the fuel cell may further improve if at the same time the anode diffusion layer is totally removed and the anode hydrophobic substrate layer is replaced with a hydrophilic substrate layer.

The fuel cells designated by the symbols □ and ▲ had a cathode support plate that contained a thinner and partially hydrophobic diffusion layer compared to the fuel cell designated by the symbol ■, which had a thick, hydrophobic cathode diffusion layer. The fuel cells designated by the symbols □ and ▲ had a greater voltage level for a given current density compared to the fuel cell designated by the symbol ■. Therefore, reducing the thickness of the diffusion layer, while increasing its hydrophilicity improves the electrical performance of the fuel cell.

FIG. 8 also illustrates that replacing the cathode hydrophobic substrate layer with a hydrophilic substrate layer further improves the electrical performance of the fuel cell. Specifically, the fuel cell designated by the symbol ▲ had a greater voltage level for a given current compared to the fuel cell designated by the symbol □. The fuel cell designated by the symbol □ had a cathode support plate that contained a hydrophobic substrate layer, but the fuel cell designated by the symbol ▲ had a cathode support plate that contained a hydrophilic substrate layer. Therefore, replacing the cathode hydrophobic substrate layer with a hydrophilic substrate layer further improves the electrical performance of the fuel cell.

Figure 9:
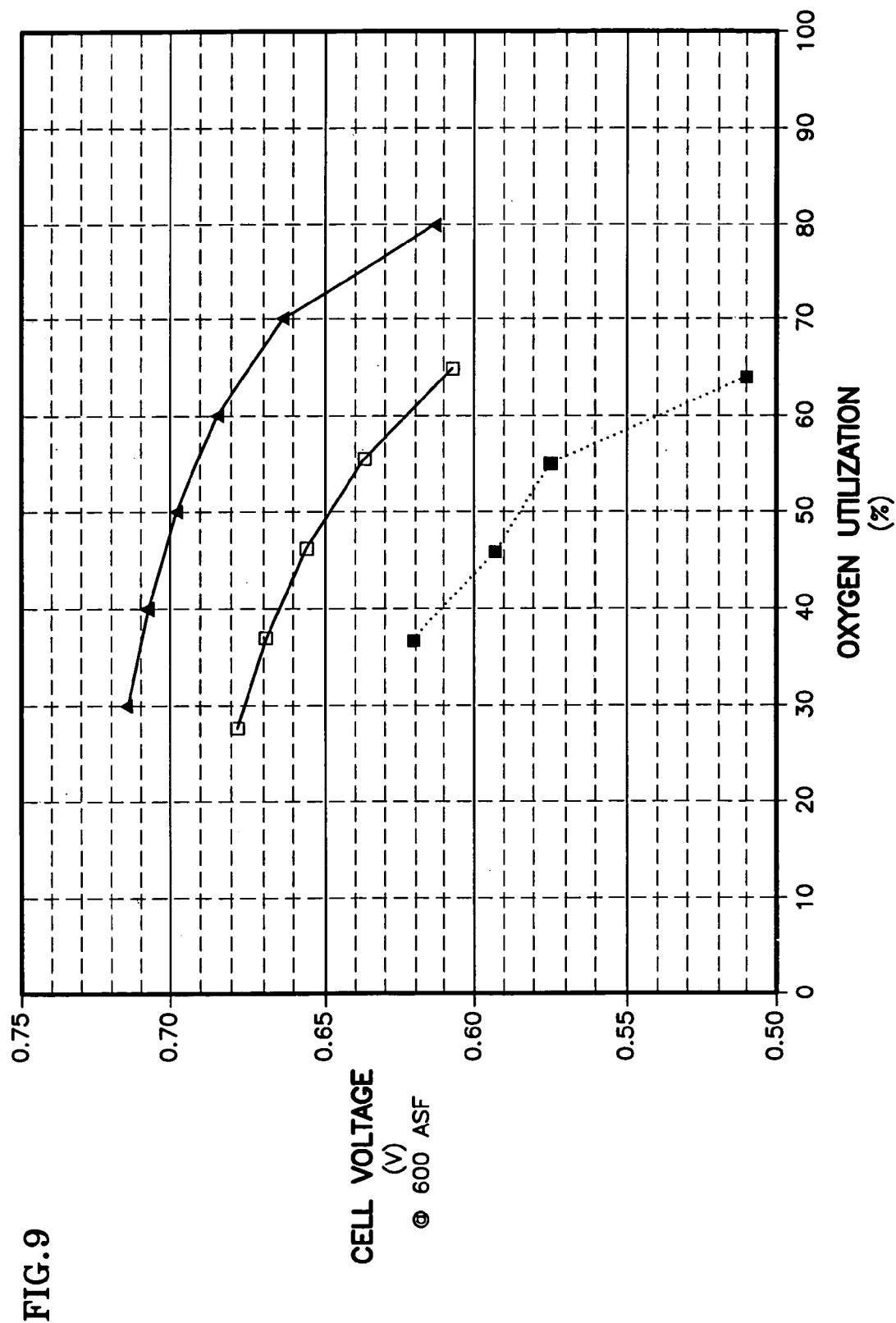
FIG. 9 is a graph of the fuel cell oxygen utilization versus the cell voltage for various fuel cell configurations illustrated in Table 1.

Replacing the cathode support plate's hydrophobic substrate layer with a hydrophilic substrate layer and reducing its thickness and increasing the hydrophilicity of the diffusion layer within the cathode not only improves the electrical performance of the fuel cell but also increases the fuel cell's oxygen utilization. Referring to FIG. 9 there is shown a graph of the fuel cell oxygen utilization versus the cell voltage for the various fuel cell configurations illustrated in Table 1 and designated by the symbols ■, □, and ▲. All three types of fuel cells utilized about 80% of the hydrogen. The fuel cell designated by the symbol □ had a higher cell voltage for a given oxygen utilization percentage than the fuel cell designated by the symbol ■, and the fuel cell designated by the symbol ▲ had an higher cell voltage for the same oxygen utilization percentage than the fuel cell designated by the symbol □. The fuel cell designated by the symbol ▲ had a cathode support plate that contained a hydrophilic substrate layer and a partially hydrophobic and thinner diffusion layer. Therefore, replacing the cathode hydrophobic substrate layer with a hydrophilic layer and reducing the thickness and hydrophilicity of the cathode diffusion layer improves the oxygen utilization of the fuel cell. Hence, for a certain amount of oxygen, the fuel cell designated by the symbol ▲ can produce more electricity than the two fuel cells designated by the symbols ■ and □.

Figure 10:
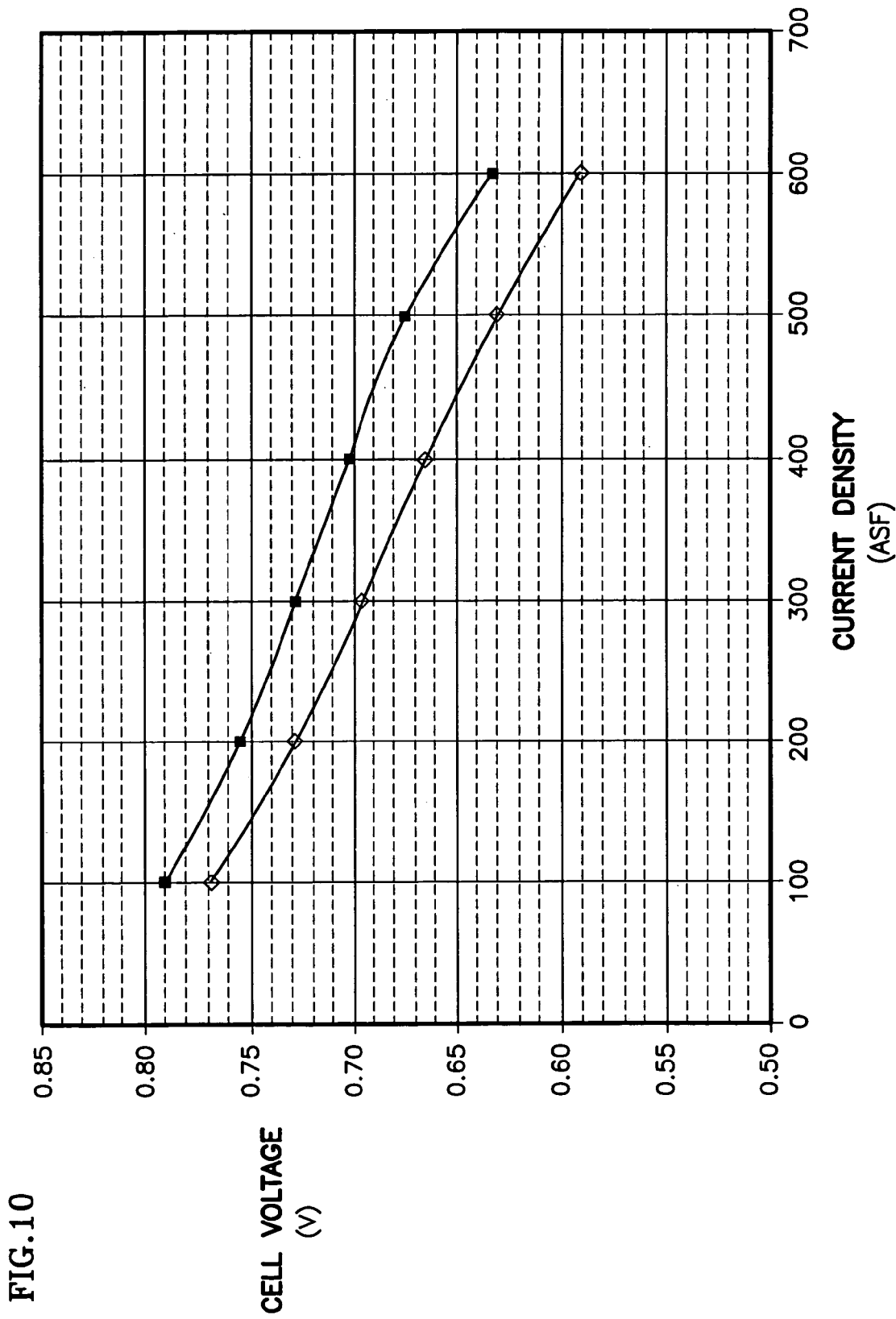
FIG. 10 is a graph of the current density versus the cell voltage for various fuel cell configurations illustrated in Table 2.

Reconfiguring the diffusion and substrate layers within the anode not only improves the operating efficiency of a fuel cell power plant fueled by pure hydrogen but also improves the operating efficiency of a fuel cell power plant fueled by reformate fuel containing approximately 46% hydrogen. Reformate fuel is a hydrogen rich gas stream that is produced by known technology from a hydrocarbon fuel. Referring to FIG. 10, there is shown a graph of the cell voltage as a function of the current density for two fuel cells, having different anode configurations, illustrated in Table 2, using a reformate fuel.

TABLE 2

| Experiment | Anode | | Cathode | |
|---|---|---|---|---|
| | Diffusion Layer | Substrate Layer | Diffusion Layer | Substrate Layer |
| ○ | Hydrophobic | Hydrophobic | Partially Hydrophobic | Hydrophobic |
| ■ | None | Hydrophilic | Partially Hydrophobic | Hydrophobic |

The fuel cells designated by the symbols ○ and ■ are the same fuel cell configurations described in reference to Table 1 and FIGS. 8 and 9. Specifically, both fuel cells had a cathode support plate, comprising a hydrophobic diffusion layer and a hydrophobic substrate layer. Moreover, the fuel cells designated by the symbols ○ and ■ contained a cathode support plate 19 having a 87.5 micron (0.0035 inch) thick partially hydrophobic diffusion layer 78 constructed of porous carbon-polytetraflouroethylene (PTFE) particulate composite, with a mass of about 12.1 milligrams per square centimeter of porous carbon-carbon fibrous composite and containing about 50% PTFE. Each cathode 19 also had a 175 micron (0.007 inch) porous carbon-carbon fibrous composite substrate layer 82 having a porosity of about 75%, and rendered hydrophobic by treating such substrates with about 165 grams of PTFE for every cubic centimeter of porous carbon-carbon fibrous composite. The configuration of the anode support plates within the fuel cells, however, differed from each other. Specifically, the fuel cell designated by the symbol ○ had an anode support plate, comprising a hydrophobic diffusion layer and a hydrophobic substrate layer, but the fuel cell designated by the symbol ■ had an anode support plate only comprising a hydrophilic substrate layer. The hydrophilic substrate layer 80 within the anode support plate 17 of the fuel cell designated by the symbol ■ was 175 micron (0.007 inch) thick. Specifically, the hydrophilic substrate layer 80 was constructed of a porous carbon-carbon fibrous composite having a porosity of about of about 75%. The porous carbon-carbon fibrous composite was rendered hydrophilic by adding about 35.0 mg of tin oxide ($SnO_2$) for every gram of carbon-carbon fibrous composite.

Both of the fuel cell configurations designated by the symbols ○ and ■ were placed in a fuel cell fueled by simulated reformate and air. The reformate fuel used in this experiment comprised about 46% hydrogen, 32% nitrogen, 22% carbon dioxide and 20 ppm of carbon monoxide. The fuel cell utilized about 80% of the hydrogen in the reformate and about 30% of the air. The fuel cell operated at about 65° C. and about ambient pressure. Additionally, in order to properly manage the product water, formed by the chemical reaction between the hydrogen and air, the pressure differential between the fuel and oxidant gas streams and the coolant stream was about two (2) psi. Each fuel cell operated for a period of ten (10) to twelve (12) days, and the graph shown in FIG. 10 illustrates the cell voltage as a function of the current density for each fuel cell configuration over such time. This figure demonstrates that the fuel cell designated by the symbol ■ had a greater voltage level for a given current compared to the fuel cell designated by the ○. Both fuel cells had identical cathode configurations. However, the fuel cell designated by the symbol ■ had an anode support plate comprising only a hydrophilic substrate and no diffusion layer, but the fuel cell designated by the symbol ○, had an anode support plate comprising hydrophobic diffusion and substrate layers. Therefore, omitting the diffusion layer within the anode support plate and/or replacing the anode hydrophobic substrate layer with a hydrophilic substrate layer improves the electrical performance of the fuel cell.

Figure 11:
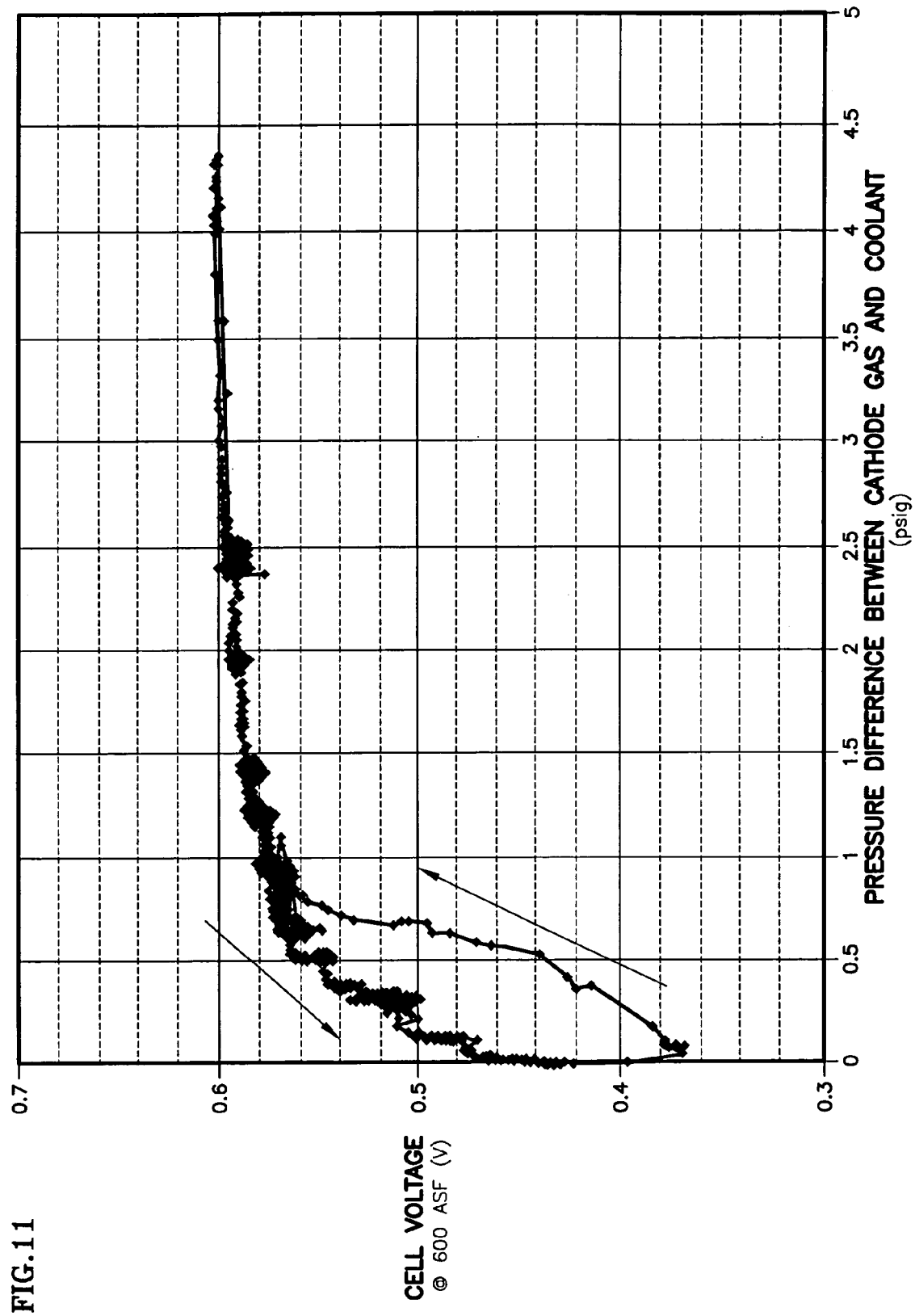
FIG. 11 is a plot of the fuel cell voltage as a function of the pressure differential between the oxidant reactant gas stream and the coolant stream.

FIG. 11 illustrates the importance of creating a pressure differential between the reactant gas streams and the coolant stream, such that the pressure of the reactant gas streams is greater than the pressure of the coolant stream. Specifically, FIG. 11 illustrates the performance of a fuel cell having a configuration designated by the symbol ▲, which was discussed in reference to Table 1. Using the same test conditions discussed hereinbefore in reference to this fuel cell and holding all such test conditions constant, with the exception of the pressure differential between the coolant and the oxidant gas stream, the fuel cell voltage was plotted as a function of pressure differential. The pressure differential between the coolant and the oxidant gas stream varied from approximately zero to 4.4 psi. Specifically, as indicated by the arrows in FIG. 11, the test began by creating a pressure differential of about 4.4 psi, which was gradually reduced to zero and thereafter gradually increased to its original pressure. As the fuel cell operated at a pressure differential equal about zero to a range of about 1.0 to 2.0 psi, the cell voltage increased from about 0.38 volts to 0.58 volts, respectively. However, as the fuel cell operated at a pressure differential in excess of about 1.0 to 2.0 psi the cell voltage remained relatively constant at a voltage of about 0.58 to 0.60 volts. The data in FIG. 11 illustrates that the performance of the fuel cell designated by the symbol ▲ improved significantly as the pressure differential between the coolant stream and the oxidant gas stream increased from zero to the range of about 1.0 to 2.0 psi, after which point the performance of the fuel cell remained relatively unchanged. Performance is improved as the pressure differential between the coolant stream and oxidant gas Increases because the water occupying the hydrophobic cathode substrate layer is displaced and enters the water transport plate adjacent the cathode support plate. Likewise, operating a fuel cell with a pressure differential between the coolant stream and the fuel reactant gas stream more accurately controls the amount of water that enters the hydrophilic anode substrate layer. A range between 0.2 psi and 1.7 psi is preferred. This aspect of the invention can be beneficial in fuel cells having no diffusion layer. Moreover, unlike the operation of the fuel cell described in U.S. Pat. No. 5,641,586, operating a fuel cell, having hydrophilic substrate layers, with a pressure differential between the coolant stream and the reactant gas streams, increases the percentage of pores within the hydrophilic substrate layers that contain reactant gas and decreases the percentage of pores that contain coolant. The increased number of pores containing reactant gas within the hydrophilic substrate layers, in turn, facilitates the diffusion of the reactant gases from the passageways in the water transport plates to the catalyst layers within the MEA.

All of the aforementioned patent applications are incorporated herein by reference.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A fuel cell, comprising;
an anode support plate and a cathode support plate and a membrane electrode assembly disposed between said anode and cathode support plates, said membrane electrode assembly comprising a polymer electrolyte membrane, at least one of said support plates comprising a hydrophilic substrate layer having pores therein;
a water transport plate adjacent to each said hydrophilic substrate layer, each said water transport plate having a passageway for a water stream and another passageway for a reactant gas stream; and
a partially hydrophobic porous carbon fluoropolymer particulate composite diffusion layer disposed between at least one said hydrophilic substrate layer and said membrane electrode assembly, each said diffusion layer comprising about 10% fluoropolymer by weight.

2. A fuel cell according to claim 1 wherein:
said diffusion layer comprises a fluoropolymer selected from the group consisting of polytetrafluoroethylene, fluorinated ethylene propylene, polytetrafluoroethylene-co-perfluoromethyl vinylether, copolymers of ethylene and tetrafluoroathylene, copolymers of ethylene and chlorotrifluoroethylene, polyvinylidene fluoride, polyvinyl fluoride and amorphous fluoropolymers.

3. A fuel cell, comprising:
an anode support plate and a cathode support plate and a membrane electrode assembly disposed between said anode and cathode support plates, said membrane electrode assembly comprising a polymer electrolyte membrane, at least one of said support plates comprising a hydrophilic substrate layer having pores therein;
a water transport plate adjacent to each said hydrophilic substrate layer, each said water transport plate having a passageway for a water stream and another passageway for a reactant gas stream; and
a diffusion layer disposed between at least one said hydrophilic substrate layer and said membrane electrode assembly, the thickness of each said diffusion layer being more than about 5.0 microns and less than 25.0 microns.

* * * * *